United States Patent
Kitaori et al.

[11] Patent Number: 5,744,234
[45] Date of Patent: Apr. 28, 1998

[54] MAGNETIC RECORDING MEDIUM

[75] Inventors: Noriyuki Kitaori; Osamu Yoshida; Hirohide Mizunoya; Katsumi Sasaki; Yuzo Matsuo; Shigemi Wakabayashi; Akira Shiga, all of Haga-gun, Japan

[73] Assignee: Kao Corporation, Tokyo, Japan

[21] Appl. No.: 547,115

[22] Filed: Oct. 23, 1995

[30] Foreign Application Priority Data

Nov. 30, 1994 [JP] Japan .................. 6-296922

[51] Int. Cl.$^6$ .................. B32B 5/00; G11B 5/68; G11B 5/70; G11B 5/64
[52] U.S. Cl. .................. 428/332; 428/694 T; 428/694 TB; 428/694 TF; 428/694 TP; 428/694 SL
[58] Field of Search .................. 428/694 T, 694 TB, 428/694 TP, 694 TC, 694 TF, 694 TM, 694 ST, 694 SL, 332

[56] References Cited

U.S. PATENT DOCUMENTS

| | | | |
|---|---|---|---|
| 4,745,510 | 5/1988 | Watanabe et al. | 360/131 |
| 5,080,971 | 1/1992 | Yokoyama et al. | 428/336 |
| 5,173,370 | 12/1992 | Takahashi et al. | 428/694 |
| 5,326,637 | 7/1994 | Nasu et al. | 428/336 |
| 5,492,774 | 2/1996 | Tateno et al. | 428/694 R |
| 5,512,349 | 4/1996 | Chiba et al. | 428/141 |

*Primary Examiner*—John J. Zimmerman
*Assistant Examiner*—Michael LaVilla

[57] ABSTRACT

A metal deposition magnetic recording medium comprising a support and at least one magnetic layer formed thereon by deposition, said recording medium having a residual magnetic flux density and a coercive force which satisfy the relationships of (1) and (2):

$$4.8 < \frac{Br \cdot H_{CV}}{(H_{CL})^2} < 6.0 \quad (1)$$

$$1.0 < \frac{Br \cdot H_{CL}}{(H_{CV})^2} < 1.5 \quad (2)$$

Br: Residual magnetic flux density
$H_{CV}$: Coercive force in the vertical direction
$H_{CL}$: Coercive force in the longitudinal direction.

The magnetic recording medium exhibits good output characteristics over a wide frequency range.

7 Claims, 1 Drawing Sheet

MAGNETIC RECORDING MEDIUM

BACKGROUND OF THE INVENTION

1. Field of the Invention

The present invention relates to a metal deposition type magnetic recording medium.

2. Description of the Background

A magnetic recording medium such as, for example, a magnetic tape includes a coating type tape which is formed of a substrate film and a magnetic coating material prepared by dispersing a magnetic powder in a binder and then applying the dispersion onto the film. Another type of tape is a deposition type tape which is formed of a substrate film on which is deposited a metal. The deposition occurs in air and no binder is employed.

A deposition type tape which is commercially available in the market now or which has been developed has a magnetic layer formed by depositing metal on a support such as PET (polyethylene terephthalate), polyimide, and aramide in a vacuum. Further, the tape is normally provided with a top coat layer in order to protect the magnetic layer. The top coat layer also functions as a lubricant for smoothing contact with a recording/reproducing head. The tape is provided with a back coat layer formed by coating carbon black (particle diameter: 10 to 100 nm), dispersed in a binder of a vinyl chloride resin, a urethane resin, a nitrocellulose resin or combinations thereof on a side opposite to the magnetic layer to a dry thickness of 0.4 to 1.0 mm by a gravure coating method, a reverse coating method or a die coating method.

The deposition type magnetic recording medium is said to be particularly useful as a high density recording medium, since it does not have a binder in the magnetic layer and therefore the density of magnetic material in the recording layer is enhanced. However, an existing deposition type magnetic recording medium shows a tendency to provide a high output in a low frequency region, for example, in the case where the recording wavelength is less than 10 MHz, or to provide a high output in a high frequency region, for example, in the case where the recording wavelength exceeds 10 MHz, as a function of the kind of magnetic metal to be deposited and the column structure of the magnetic layer. Such magnetic recording media have different magnetostatic characteristics, and the existing state of the art is such that a magnetic recording medium which exhibits excellent output characteristics over the whole frequency region is not known. A need therefore continues to exist for a deposition type recording medium of improved recording characteristics.

SUMMARY OF THE INVENTION

Accordingly, one object of the present invention is to provide a deposition type recording medium which exhibits excellent output characteristics over the whole frequency region.

Briefly, this object and other objects of the present invention as hereinafter will become more readily apparent can be attained in a magnetic recording medium comprising a support and at least one magnetic layer formed on the support by deposition, wherein the residual magnetic flux density and a coercive force of the above magnetic recording medium satisfy relations (1) and (2) below:

$$4.8 < \frac{Br \cdot H_{CV}}{(H_{CL})^2} < 6.0 \quad (1)$$

$$1.0 < \frac{Br \cdot H_{CL}}{(H_{CV})^2} < 1.5 \quad (2)$$

Br: Residual magnetic flux density
$H_{CV}$: Coercive force in a vertical direction
$H_{CL}$: Coercive force in a longitudinal direction

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein the FIGURE shows the layered structure of the magnetic recording medium of the present invention.

DETAILED DESCRIPTION OF THE PREFERRED EMBODIMENTS

Figure 1:
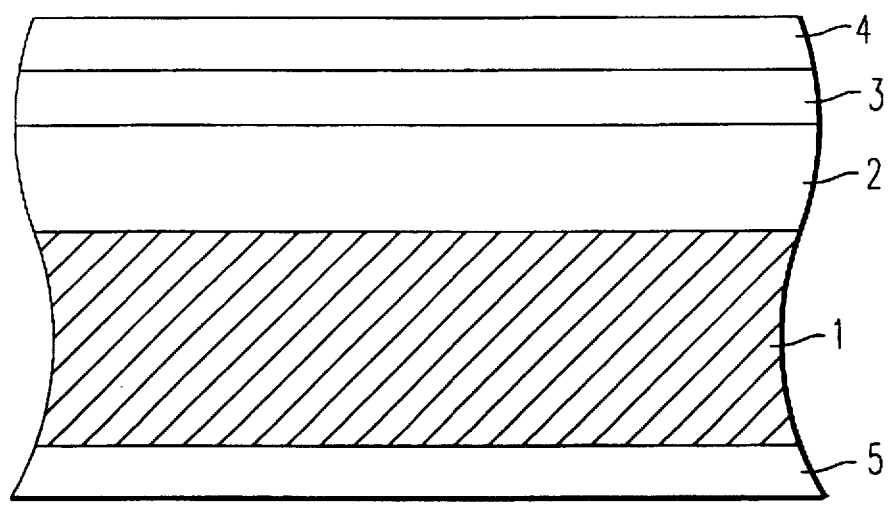

In the present invention, Br, $H_{CV}$ and $H_{CL}$ are measured with a visolating sample magnet sample oscillation type flux meter (VSM), wherein the coercive force measured, while inserting the sample in the longitudinal direction of the device against a magnetic flux is $H_{CV}$, and the coercive force measured while inserting the sample in the vertical direction against the magnetic flux is $H_{CL}$.

In order to satisfy the relation between Br, $H_{CV}$ and $H_{CL}$ in relationships (1) and (2) above, it is necessary to control the deposition conditions, the kind of magnetic metal and the thickness of the magnetic layer.

As shown in FIG. 1, the magnetic recording medium of the present invention comprises a magnetic layer 2 comprising at least one thin metal film formed on a support 1 by methods such as deposition, a protective layer 3 comprising diamond-like carbon and formed on the above magnetic layer, a lubricant layer 4 formed on the above protective layer 3, and a back coat layer comprising metal or semi-metal and formed on a side opposite to the support side on which the magnetic layer 2 is formed. The respective layers will be explained below.

[Magnetic layer]

The magnetic materials for forming the magnetic layer include ferromagnetic metallic materials which are used in the manufacture of conventional metal thin film type magnetic recording media. Suitable metallic materials include, for example, ferromagnetic metals such as Co, Ni and Fe, and ferromagnetic alloys such as Fe—Co, Fe—Ni, Co—Ni, FeCo—Ni, Fe—Fh, Fe—Cu, Co—Cu, Co—Au, Co—Y, Co—La, Co—Pr, Co—Gd, Co—Sm, Co—Pt, Ni—Cu, Mn—Bi, Mn—Sb, Mn—Al, Fe—Cr, Co—Cr, Ni—Cr, Fe—Co—Cr, and Ni—Co—Cr. The magnetic layer is preferably a thin film of iron or a thin film of a ferromagnetic alloy comprising primarily iron, particularly preferably a thin film of at least one substance selected from a ferromagnetic alloy comprising primarily iron, cobalt and nickel, and a nitride or carbide thereof such as Fe—N—O, Fe—C—O, Fe—N—C—O, Fe—Ni—N—O, Fe—Co—Ni—O, Fe—Ni—C—O, Fe—Co—C—O, Fe—Ni—N—C—O, or Fe—Co—Ni—N—C—O.

The magnetic layer of the magnetic recording medium is preferably formed on a substrate by oblique deposition for high density recording. The method used to achieve oblique deposition is not specifically limited. Any conventional method can be used. The degree of vacuum during deposition resides is at a level $10^{-4}$ to $10^{-7}$ Torr. The magnetic layer formed by deposition may be of a single layer structure or a multi-layer structure. In particular, durability of the tape can be enhanced by forming an oxide on the surface of the magnetic layer by introducing an oxidizing gas into the deposition device.

In the present invention, the thickness of the magnetic layer is not critically limited. The thickness can range from 1000 to 3000 Å, preferably 1000 to 2400 Å. The magnetic layer may be a single layer or several layers. In case of several layers, 2 to 5 layers are preferred.

[Protective layer]

In the magnetic recording medium of the present invention, a protective layer may be formed on the magnetic layer.

The protective layer is formed on the magnetic layer in vacuum. The protective layer is preferably formed by depositing carbon, a carbide, a nitride or an oxide, particularly diamond-like carbon, diamond, boron carbide, silicon carbide, boron nitride, silicon oxide, or aluminum oxide on the magnetic layer as a film.

The method of deposition for forming the protective layer may be either a chemical vapor deposition method (CVD) or a physical vapor deposition method (PVD). As CVD methods, an ECR method using a microwave and a method using a high-frequency wave (RF) are particularly effective. When the protective layer is formed by a CVD method, the raw material may be gaseous, liquid or solid. When diamond-like carbon is formed with a gaseous material, a mixed gas of methane and argon, a mixed gas of ethane and hydrogen, or a mixed gas of methane and hydrogen is preferably used. When diamond-like carbon is formed with a liquid material, alcohols and unsaturated hydrocarbons are preferably used. Further, when diamond-like carbon is formed with a solid material, naphthalene or higher paraffin is preferably used. In this case, the solid may be heated or irradiated by a supersonic wave.

PVD methods include heat evaporation, sputtering and ion plating. Any of these methods can be used. In the present invention, sputtering is particularly effective. When diamond-like carbon is formed by sputtering, sputtering is preferably carried out in a mixed gas of methane and argon or a mixed gas of methane and hydrogen with graphite used as a target. When the protective layer is formed with silicon nitride, it is preferred to employ silicon as a target and a mixed gas of argon and nitrogen, a mixed gas of argon and ammonia, nitrogen, ammonia, or a mixed gas of ammonia and a monosilane ($SiH_4$) as a discharging gas. When the protective layer is formed with aluminum oxide, it is effective to employ aluminum as a target and a mixed gas of argon and oxygen as the discharging gas.

The degree of vacuum is at a level of 10 to $10^{-5}$ Torr in the case of the CVD method and at a level of $10^{-4}$ to $10^{-7}$ Torr in the case of the PVD method. The thickness of the protective layer is not specifically limited. The suitable thickness ranges from 10 to 300 Å, preferably 30 to 150 Å.

[Lubricant layer]

In the present invention, a lubricant layer comprising a suitable lubricant may be formed on the magnetic layer or, if the protective layer is formed, on the protective layer.

The lubricant layer may be formed by dissolving a suitable lubricant in a solvent and then coating the protective layer in the air by conventional methods or by spraying a lubricant in a vacuum.

In the method by which a lubricant is sprayed in vacuum, the lubricant is preferably sprayed on a magnetic layer formed on a support with a sprayer equipped with a supersonic oscillator (hereinafter referred to as a supersonic sprayer). In more detail, the supersonic sprayer comprises a supply means for a lubricant, a means (supersonic oscillator) for atomizing the lubricant discharged from the supply means by applying a supersonic wave to the lubricant, and a nozzle for spraying the atomized lubricant. Also, a nozzle type sprayer may be used. In general, a device called a single-fluid nozzle can be used for the nozzle type sprayer.

Using a supersonic sprayer to spray a lubricant in the form of fine particles makes it possible to deposit a fluorine type lubricant such as perfluoropolyether, which has thus far been used to form lubricant layers by coating in air, because of poor durability at high temperatures (200° C. or higher) and low vapor pressure.

Perfluoropolyether preferably has a molecular weight of 2000 to 5000. Products which can be used are commercially available and are sold under the trade names of, for example, "FOMBLIN Z DIAC" (carboxyl group-modified, manufactured by Montecatini Co., Ltd.) and "FOMBLIN Z DOL" (alcohol-modified, manufactured by Montecatini Co., Ltd.). Since these materials have hydroxyl groups or carboxyl groups at the terminals, they can enhance binding between the lubricant and the magnetic layer and therefore are particularly suitable for use in the present invention.

Incidentally, other useful fluorine lubricants include those which contain benzene rings, double bonds and branched chains, and lubricants such as aliphatic acid type lubricants, and others. However, since the fluorine type lubricants enhance not only durability, but also corrosion resistance, in comparison to the aliphatic acid type lubricants, they are particularly useful in the present invention.

In spraying the lubricant, the lubricant is generally used in the form of solutions of 0.001 to 10 weight %, preferably 0.02 to 2.0 weight %. The solutions are prepared by dissolving a lubricant in suitable solvent such as an inert fluorine type solvent, examples of which include a perfluorocarbon such as "Fluorinate" manufactured by Sumitomo 3M Co., Ltd. and perfluoropolyethers such as "Galdene" manufactured by Montecatini Co., Ltd.), or an alcohol type of solvent. When perfluoropolyethers are used as the lubricant, perfluorocarbons can be used as the solvent, wherein the concentration is at a level of 0.001 to 1.0 weight %, particularly 0.05 to 0.2 weight %.

Particles of lubricants (lubricant solutions) which are sprayed are sprayed as fine as possible. The frequency of the supersonic wave applied to the solution is determined by the type and viscosity of the lubricant and is generally selected within the range of 10 KHz to 5 MHz.

The amount of the lubricant sprayed or coated is determined by the application of the magnetic recording medium and the type of lubricant. It is preferably controlled so that the thickness of the lubricant layer ranges from 10 to 200 Å. The vacuum employed in spraying the lubricant ranges from $5\times10^{-4}$ to $5\times10$ Torr, preferably $5\times10^{-1}$ to $5\times10^{-2}$ Torr.

[Back coat layer]

In the magnetic recording medium of the present invention, the back coat layer can be formed on the side opposite the support side on which the magnetic layer is formed. The back coat layer may be formed by coating a solution prepared by dispersing carbon black or the like in a suitable solvent, or by depositing a metal or semi-metal by the physical vapor deposition method (PVD), particularly by heat evaporation or by sputtering.

When the back coat layer is formed by coating, carbon black having a grain diameter of 10 to 100 nm is dispersed in a binder of a polyvinyl chloride, a polyurethane or nitrocellulose and coated by a gravure method, a reverse method or a dye coating method to a dry thickness of 0.4 to 1.0 mm.

When the back coat layer is formed by deposition, aluminum and silicon are preferred as metal or semimetal materials, and the thickness of such a layer ranges from 0.05 to 1.0 mm.

[Support]

Suitable supports for the magnetic recording medium include plastics such as polyesters including polyethylene terephthalate and polyethylene naphthalate; polyolefins such as polyethylene and polypropylene; cellulose derivatives such as cellulose triacetate and cellulose diacetate; polycarbonate; polyvinyl chloride; polyimide; and aromatic polyamides. The thickness of these supports range from 3 to 50 mm.

[Others]

In the magnetic recording medium of the present invention, a suitable intermediate layer may be formed between the support and the magnetic layer. The intermediate layer may be formed by coating a magnetic coating material prepared by dispersing non-magnetic particles, for example, carbon black or α-alumina in a suitable binder, or it may be formed by depositing a nonmagnetic metal such as aluminum. The thickness of the intermediate layer is not limited.

Having generally described this invention, a further understanding can be obtained by reference to certain specific examples which are provided herein for purposes of illustration only and are not intended to be limiting unless otherwise specified.

EXAMPLES

EXAMPLES 1 TO 4 AND COMPARATIVE EXAMPLES 1 TO 4

(i) Production of a magnetic tape

A back coat layer having a thickness of 0.5 mm comprising Al—O was formed on a PET film (thickness: 6 mm) by deposition. Next, the first magnetic layer having a thickness of 1000 Å comprising cobalt was formed by deposition on a face of the PET film opposite the face on which the back coat layer was formed, and then the second magnetic layer having a thickness of 1000 Å comprising cobalt was formed on the first magnetic layer by deposition, followed by forming a diamond-like carbon layer having a thickness of 50 Å on the second magnetic layer in an ECR plasma CVD apparatus. Further, a 0.05 weight % solution (solvent: a fluorine type inert liquid "FC-77" manufactured by Sumitomo 3M Co., Ltd.) of perfluoropolyether "FOMBLIN AM 2001" (manufactured by Montecatini Co., Ltd.) was coated to a dry thickness of 20 Å on the diamond-like carbon layer in a different chamber and then dried at 100° C., and a magnetic film was obtained.

Thereafter, the magnetic film was taken out into the air and slit to a width of 8 mm. The film was then loaded into an 8 mm cassette, whereby a video cassette for Hi-8 was prepared (Example 1).

A series of tapes were prepared by changing the incident angle of metal vapor onto the support in forming a film by deposition, the position of a crucible, the canroll diameter, the amount of introduced oxygen, the manner for introducing oxygen, and the film thickness. The coercive force and residual magnetic flux density of each film was measured.

(ii) Evaluation of performance

The coercive force and the residual magnetic flux density of the video cassettes obtained in the manner described above are shown in Table 1. Further, the results obtained by evaluating the outputs in 5, 10, 20 and 25 MHz with an amplifier given by remodeling an ED-b-VTR apparatus are shown in Table 1.

TABLE 1

| | $H_{CL}$ (Oe) | $H_{CV}$ (Oe) | Br (G) | $Br \cdot H_{CV}$ $(H_{CL})^2$ | $Br \cdot H_{CL}$ $(H_{CV})^2$ | Output* 5 MHz (dB) | 10 MHz (dB) | 20 MHz (dB) | 25 MHz (dB) |
|---|---|---|---|---|---|---|---|---|---|
| Example 1 | 1360 | 2260 | 4700 | 5.74 | 1.25 | +2.1 | +2.6 | +3.2 | +3.4 |
| Example 2 | 1650 | 2600 | 6000 | 5.73 | 1.46 | +1.8 | +2.3 | +3.4 | +4.1 |
| Example 3 | 1490 | 2260 | 5100 | 5.19 | 1.49 | +2.2 | +2.7 | +3.3 | +3.5 |
| Example 4 | 1250 | 2190 | 4000 | 5.60 | 1.04 | +2.5 | +2.5 | +2.2 | +2.1 |
| Comp. Ex. 1 | 1680 | 2260 | 5000 | 4.00 | 1.64 | +0.5 | +1.5 | +1.8 | +1.9 |
| Comp. Ex. 2 | 1050 | 1530 | 3400 | 4.72 | 1.53 | 0 | 0 | 0 | 0 |
| Comp. Ex. 3 | 1200 | 1480 | 6000 | 6.17 | 3.29 | +2.4 | +2.5 | +1.2 | +0.8 |
| Comp. Ex. 4 | 1450 | 2320 | 3500 | 3.86 | 0.94 | −0.8 | −0.1 | +1.0 | +1.9 |

*Outputs are the values based on the outputs in Comparative Example 2.

As explained above, the present invention provides a metal deposition magnetic recording medium which exhibits good output characteristics over a wide frequency range.

Having now fully described the invention, it will be apparent to one of ordinary skill in the art that many changes and modifications can be made thereto without departing from the spirit or scope of the invention as set forth herein.

What is claimed as new and is desired to be secured by Letters Patent of the United States is:

1. A metal deposition magnetic recording medium comprising a support and at least one magnetic layer formed thereon by deposition, said recording medium having a residual magnetic flux density and a coercive force which satisfy the relationships of (1) and (2):

$$4.8 < \frac{Br \cdot H_{CV}}{(H_{CL})^2} < 6.0 \quad (1)$$

$$1.0 < \frac{Br \cdot H_{CL}}{(H_{CV})^2} < 1.5 \quad (2)$$

Br: Residual magnetic flux density $H_{CV}$: Coercive force in the vertical direction $H_{CL}$: Coercive force in the longitudinal direction.

2. The metal deposition magnetic recording medium of claim 1, wherein the magnetic layer is formed from a metal or alloy selected from the group consisting of Co, Ni, Fe, Fe—Co, Fe—Ni, Co—Ni, Fe—Co—Ni, Co—Gd, Co—Sm, Co—Pt, Fe—Cr, Co—Cr, Ni—Cr, Fe—Co—Cr, and Ni—Co—Cr.

3. The metal deposition magnetic recording medium of claim 1, wherein the support is a polyester, a polyolefin, a cellulose derivative, a polycarbonate, a polyvinyl chloride, a polyimide or an aromatic polyamide.

4. The metal deposition magnetic recording medium of claim 1, wherein the thickness of the magnetic layer ranges from 1000 to 3000 Å.

5. The metal deposition magnetic recording medium of claim 1, wherein a protective layer of carbon, a carbide, a nitride or an oxide is formed on said magnetic layer.

6. The metal deposition magnetic recording medium of claim 1, wherein the protective layer is provided with a lubricant layer of a fluorine containing lubricant.

7. The metal deposition magnetic recording medium of claim 1, wherein the support layer is provided with a back coat layer of a metal, semi-metal or carbon.

* * * * *